United States Patent [19]

Fujimoto

[11] Patent Number: 5,105,921

[45] Date of Patent: Apr. 21, 1992

[54] DAMPER DISK

[75] Inventor: Shinji Fujimoto, Neyagawa, Japan

[73] Assignee: Kabushiki Kaisha Daikin Seisakusho, Japan

[21] Appl. No.: 445,635

[22] PCT Filed: Apr. 14, 1989

[86] PCT No.: PCT/JP89/00407

§ 371 Date: Dec. 7, 1989

§ 102(e) Date: Dec. 7, 1989

[87] PCT Pub. No.: WO89/10503

PCT Pub. Date: Nov. 2, 1989

[30] Foreign Application Priority Data

Apr. 25, 1988 [JP] Japan .............................. 63-55754[U]
Apr. 25, 1988 [JP] Japan ................................. 63-102100

[51] Int. Cl.⁵ ......................... F16H 45/02; F16D 3/12
[52] U.S. Cl. ................. 192/3.28; 192/106.2; 464/66
[58] Field of Search ................. 192/3.28, 3.29, 3.3, 192/304, 106.2; 464/66, 67

[56] References Cited

U.S. PATENT DOCUMENTS

| 4,027,757 | 6/1977 | Redke et al. | 192/106.2 |
| 4,188,806 | 2/1980 | Fall et al. | 192/106.2 X |
| 4,274,519 | 6/1981 | Moroto et al. | 192/3.28 |
| 4,646,886 | 3/1987 | Nishmura | 192/3.28 |
| 4,690,257 | 9/1987 | Suzuki et al. | 192/106.2 X |
| 4,875,562 | 10/1989 | Fujimoto | 192/3.28 |
| 4,909,362 | 3/1990 | Miura et al. | 192/3.28 |

FOREIGN PATENT DOCUMENTS 61-28126 8/1986 Japan .
63-75655 5/1988 Japan .

Primary Examiner—Richard Lorence

[57] ABSTRACT

A damper disc comprising an annularly extending retainer plate assembly for holding in position a damper spring circumferentially connecting an annular input plate and an output plate, the retainer plate assembly having a stationary portion fixed to the input plate, a connector portion connected to the spring, and a support portion for supporting the outer periphery of the spring, the input plate being formed on its outer periphery with a cylindrical portion fitted on the outer periphery of the cylindrical support portion, the retainer plate assembly being comprised of an annular plate having the stationary portion, connector portion, and support portion, the stationary portion being fixed by rivets to the input plate, the retainer plate being formed with notches at the outer periphery thereof in the form of an opening and a slit.

1 Claim, 2 Drawing Sheets

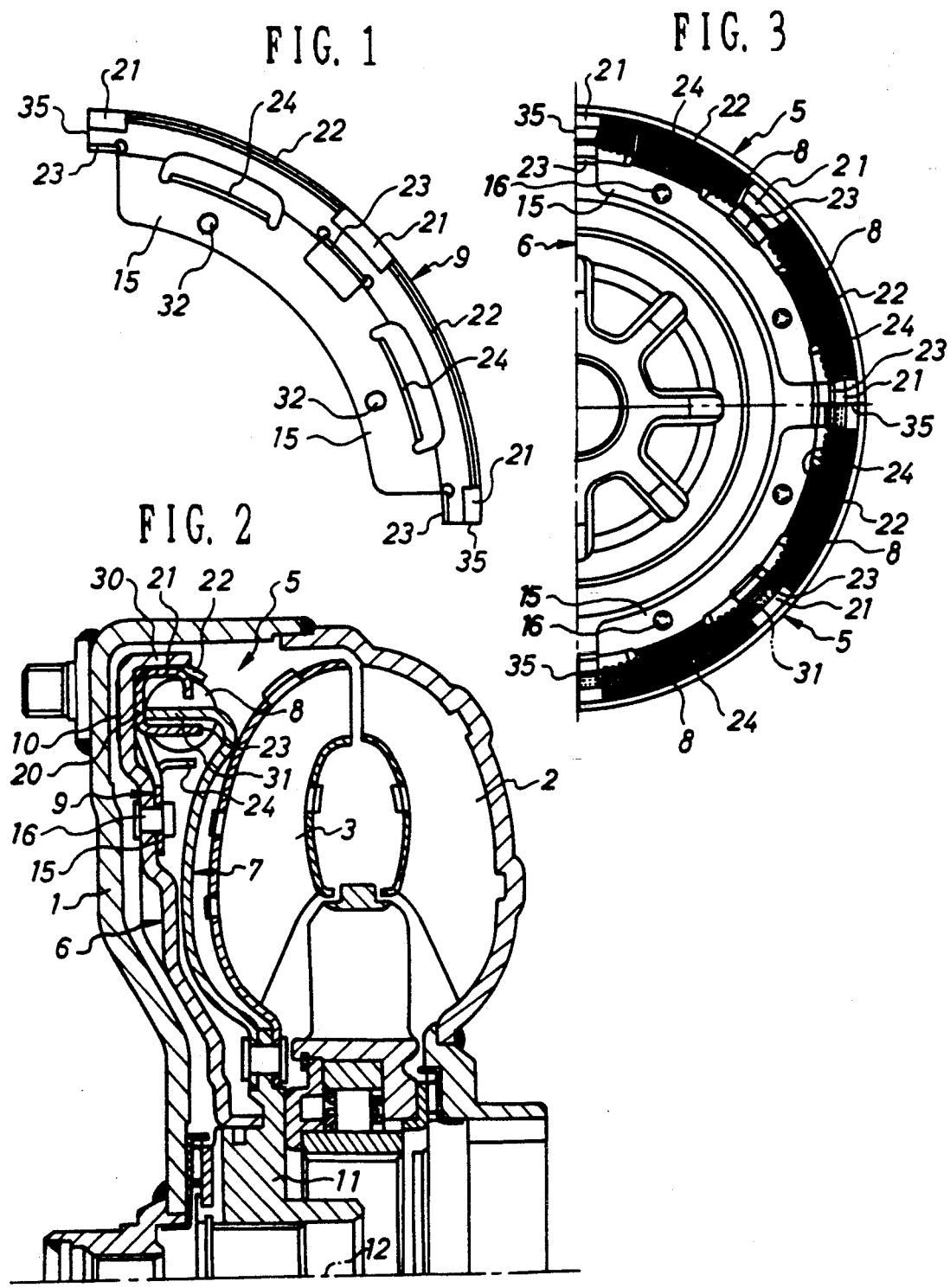

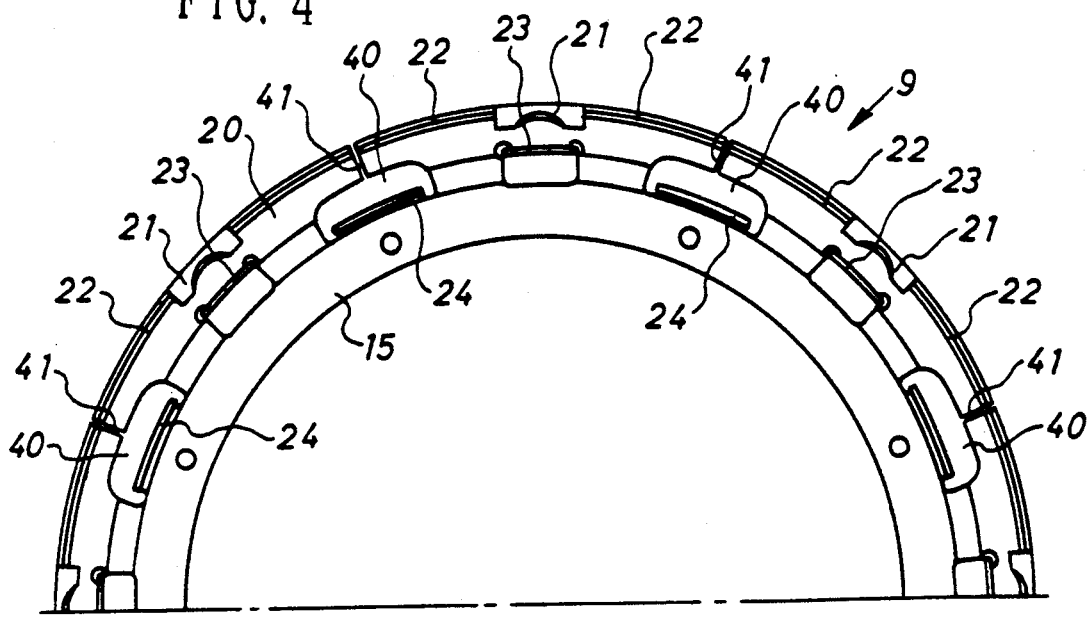
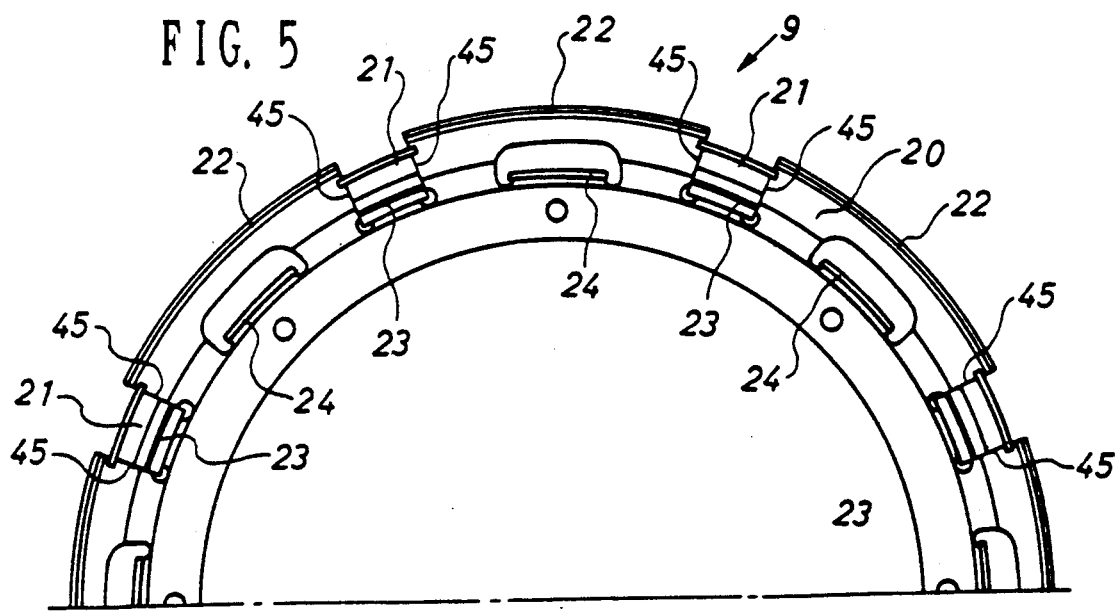
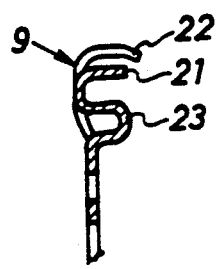

5,105,921

DAMPER DISK

BACKGROUND OF THE INVENTION

1. Field of the Invention

This invention relates to a damper disc for use in a lockup clutch of an automotive torque converter or the like and, more particularly, to improvements in the construction of a retainer plate in such damper disk for holding a damper spring in position.

2. Description of the Prior Art

A damper disk of the type to which the invention is directed is described in Japanese Utility Model Application No. 61-170593 filed by the present applicant. The damper disc includes an input plate (a piston) fitted with an input friction facing, an output plate securely fixed to a turbine (a turbine shell or turbine hub), a damper spring (a coil spring) for interconnecting the two plates, and a retainer plate for holding the spring in position.

The retainer plate is securely fixed to the input plate and has a connector (a pawl) connecting circumferentially to one end of the spring. Therefore, the input plate is connected to the spring through the retainer plate. The retainer plate is adapted to perform a function to radially retain the spring and, to this end, it has a partially cylindrical inner support portion extending along the inner periphery of the spring and a partially cylindrical outer support portion extending along the outer periphery of the spring. Further, a cylindrical portion is provided on the outer periphery of the input plate, and the above mentioned outer support portion extends into the cylindrical portion.

According to this arrangement, when the spring begins to move radially outwardly under centrifugal force during engine operation, the outer support portion supports the spring in position to prevent it from making such movement thereby to stabilize the posture of the spring so that the spring can be allowed to perform its required operation. In this process of operation, the outer support portion is supported with respect to its outer periphery by means of the cylindrical portion of the input plate and is accordingly prevented from being substantially deformed radially by the centrifugal force from the spring.

However, the retainer plate is highly rigid because it has been subjected to hardening treatment, and the input plate also has high rigidity; and therefore in the stage of assembling it is difficult to elastically deform the plates thereby to allow the retainer plate to be brought into assembly with the input plate. As such, when possible dimensional errors with respect to the two plates are considered, it is necessary that, in the stage of assembly work, the outer diameter of the outer support portion of the retainer plate be set slightly smaller than the inner diameter of the outer peripheral cylindrical portion of the input plate in order to allow the outer support portion to be fitted in the outer peripheral cylindrical portion. Therefore, a slight clearance is created between the support portion and the cylindrical portion, so that when the support portion is subjected to the centrifugal force from the spring as above noted, the support portion will be radially outwardly deformed by an amount equivalent to the clearance with the result that a crack may be caused to the retainer plate.

The object of the invention is to provide a retainer plate construction which solves the foregoing problem.

SUMMARY OF THE INVENTION

In order to accomplish the above objective, the invention provides a damper disc wherein an arcuate retainer plate assembly comprised of a plurality of arcuate retainer plates is employed instead of the conventional single-plate type retainer plate, the arcuate retainer plates being so arranged as to form an annular entirety, the retainer plates each having a stationary portion fixed to an input plate, a connector portion connected to a spring, and a support portion for supporting the spring in position, each stationary portion being fixed by rivets to the input plate, the stationary portion having radially elongate holes formed therein through which the rivets are inserted.

According to this arrangement, when the retainer plate assembly is fitted in the interior of the outer peripheral cylindrical portion of the input plate in the state of assembly work, the constituent retainer plates may be individually incorporated in position and fixed by rivets. Therefore, each retainer plate can be incorporated in position in such a manner that its support portion is held in contact with the inner periphery of the cylindrical portion of the input plate. Further, the assembly work can be easily done because the rivet insertion holes of the retainer plate are radially elongate, which permits the retainer plate to be radially adjusted as to its position in the assembly work.

According to the above arrangement, even if centrifugal force from the spring is exerted on the support portion of the retainer plate during engine operation, the support portion is not liable to be radially outwardly deformed, since the support portion is constantly supported by the cylindrical portion of the input plate; and therefore the retainer plate can be positively prevented from being cracked or otherwise.

According to another aspect of the invention, there is provided a damper disc comprising a stationary portion formed on an inner peripheral portion of a retainer plate and fixed to an input plate, connector portions and support portions for springs formed radially outward of the stationary portion and arranged in circumferentially alternate relation, and notches provided in the retainer plate and each extending from a radially median portion of the retainer plate to the outer periphery of a corresponding support portion.

According to this arrangement, for the purpose of setting the retainer plate into the interior of the outer peripheral portion of the input plate, the support portion can be resiliently deformed radially inwardly, because the support portions and adjacent retainer plate portions are split by notches. Therefore, even if the outer diameter of the support portion prior to assembly is set slightly greater than the inner diameter of the cylindrical portion of the input plate, the retainer plate can be resiliently deformed to thereby set the support portion into the interior of the cylindrical portion of the input plate, so that the support portion can be fitted in the cylindrical portion in close contact relation with the inner periphery thereof.

More specifically, in the process of retainer plate fabrication, the outer diameter of the support portion is set within a range between a specified minimum value and a specified maximum value, and the difference between the two values is a tolerance. By setting the minimum value at a value equal to or slightly larger than the inner diameter of the cylindrical portion of the input plate it is possible to set the support portion into the interior of the cylindrical portion in close contact relation therewith even where the diameter of the support portion is minimum. Also, by setting the tolerance at a value lower than an allowable resilient deformation value it is possible to resiliently deform the support portion in order to set the support portion into the interior of the cylindrical portion in close contact therewith.

According to the invention, the above mentioned allowable resilient deformation value is larger and, therefore, the tolerance can be set comparatively large. Accordingly, the support portion can be fitted into the cylindrical portion in close contact relation therewith without particular need for precision working.

According to another aspect of the invention, there is provided a damper disc comprising a stationary portion formed on an inner peripheral portion of a retainer plate and fixed to the input plate, connector portions and support portions for springs formed in circumferentially alternate relations in areas radially outward of the stationary portion, and a slit formed at a boundary portion between each of the areas in which the connector portions are formed and a corresponding one of the areas in which the support portions are formed and extending to the outer periphery of the retainer plate.

According to this arrangement, when setting the retainer plate into the interior of the outer peripheral cylindrical portion of the input plate during the stage of assembly work, the support portion can be fitted into the cylindrical portion in close contact relation therewith, since the retainer plate is split at a plurality of locations at least in its outer peripheral side portion, which means increased allowable resilient deformation of the support portion.

BRIEF DESCRIPTION OF THE DRAWINGS

FIG. 1 is a front view of a retainer plate representing one embodiment of the invention;

FIG. 2 is a partial schematic view in section of a torque converter employing the embodiment of the invention;

FIG. 3 is a partial schematic view in front elevation of the clutch disc shown in FIG. 2;

FIG. 4 is a partial front view of a retainer plate representing another embodiment;

FIG. 5 is a partial front view of a retainer plate representing still another embodiment; and FIG. 6 is a sectional view of the retainer plate shown in FIG. 5.

DESCRIPTION OF THE PREFERRED EMBODIMENTS

In FIG. 2, a front cover 1 of a torque coverter is connected to a flywheel of an engine not shown and its outer peripheral end is fixed to an end of a shell of an impeller 2. A turbine 3 is disposed between the front cover 1 and the impeller 2, and a clutch disc 5 (damper disc) for a lock-up clutch is disposed between the turbine 3 and the front cover 1.

The clutch disc 5 includes a piston 6 as an input plate, an output plate 7, damper springs 8, and retainer plates generally designated 9. A friction facing 10 is fixed to an outer peripheral portion of the piston 3 so that the clutch is connected by bringing the facing 10 into abutment against the inner surface of the front cover 1, whereupon torque is inputted from the front cover 1 to the piston 6. Such connecting operation is performed by causing relative changes in hydraulic pressure at opposite sides of the piston 6 by hydraulic control means not shown.

The output plate 7 is located between the piston 6 and the turbine 3 and fixed on its inner periphery to a turbine hub 11 of the turbine 3. The turbine hub 11 is connected to an output shaft 12 (center line only of which is shown). Springs 8 are of the compression coil spring type and are disposed in plurality in spaced apart relation in the circumferential direction of the clutch disc 5, each circumferentially extending.

The retainer plates 9 are disposed between the piston 6 and the output plate 7, each being fixed at base 15 by rivets 16 to a radially median portion of the piston 6 (or to a portion adjacent the outer periphery thereof). On an outer peripheral portion of each retainer plate 9 there is provided a portion 20 which extends in radial and circumferential directions of the clutch disc 5. A connector portion 21 and an outer peripheral support portion 22 extend from the outer periphery of the portion 20 generally toward the turbine 3, and a connector portion 23 extend from the inner periphery of the portion 20 toward the turbine 3. Radially inwardly of the connector portion 23 there is provided an inner peripheral support portion 24 extending toward the turbine 3.

Each of the springs 8 is located between outer peripheral support portion 22 and inner peripheral support portion 24 while it is in contact with or in close proximity to portion 20. The outer peripheral support portion 22 supports the outer periphery of the spring 8, and the inner peripheral support portion 24 supports the inner periphery of the spring 8.

The piston 6 is provided on its outer peripheral portion with a cylindrical portion 30 extending integrally therewith toward the impeller 2. The outer periphery of the outer peripheral support portion 22 (and the outer periphery of the connector portion 21 in the embodiment shown) is fitted in the cylindrical portion 30 in close contact with the inner periphery thereof.

A radially inwardly oriented pawl is provided at the front end of each connector portion 21. This pawl and corresponding connector portion 23 are in engagement with ends of adjacent springs 8 in the circumferential direction of the disk. On the outer periphery of the output plate 7 there are provided bent pawls 31 each of which enters into a gap between corresponding connector portions 21, 23. Each pawl 31 is also in engagement with ends of adjacent springs 8 in the circumferential direction of the disc.

Accordingly, when the clutch is connected so that torque is inputted to the piston 6 as above mentioned, the torque is transmitted from the piston 6 to one end of each spring 8 through connector portions 21, 23 of each retainer plate 9 and thence transmitted from the connector portion between the other end of the spring 8 and adjacent pawl 31 to the output plate 7, the torque being then transmitted from output plate 7 to the output shaft 12 through the turbine hub 11.

FIG. 1 is a front view of a unit retainer plate generally designated 9, and FIG. 3 is a partial front view of the clutch disc 5. As is apparent from these views, each retainer plate 9, opposite ends of which are shown by reference numeral 35, is an arcuate member, and four of such retainer units are provided in the clutch disc 5 as a whole, which retainer units 9 are circumferentially arranged to form an annularly extending retainer plate assembly. In other words, the retainer plate assembly is split at four circumferential locations. Each retainer plate 9 has a pair of connector portions 21, 23 each at opposite ends and at an intermediate site, the connector portions 21, 23 being radially arrayed. The retainer plate 9 also has an outer peripheral support portion 22 and an inner peripheral support portion 24 at locations intermediate between each end and a circumferentially median portion (i.e., at two locations). Each end of the retainer plate 9 is cut away at a portion radially inward of the connector portion 23. The connector portions 21, 23 at opposite ends of each retainer plate 9 have a circumferential length corresponding to one half of that of the connector portions 21, 23 at a circumstatially median portion.

Rivet insertion holes 32 in retainer plate base 15, FIG. 1, for inserting rivets 16 (FIG. 2) are provided at locations radially inward of a circumferentially median portion of each inner peripheral support portion 24. Each rivet insertion hole 32 is elongated in a radial direction of the clutch disc 5 so that for the purpose of fixing rivet 16 in position, the position of the retainer plate 9 relative to the rivet 16 and/or piston 6 may be radially slightly adjusted.

According to the above described arrangement, when setting the retainer plate assembly into the interior of the outer peripheral cylindrical portion 30 of the piston 6 in the stage of assembly work, retainer plates 9 may be individually set in position and then fixed by rivets 16. Therefore, each retainer plate 9 can be set in position so that the outer support portion 22 is in close contact with the inner periphery of the cylindrical portion 30. The fact that each rivet insertion hole 32 is elongated permits such assembly work to be performed at ease.

According to the arrangement, even if centrifugal force from the springs 8 is exerted upon the support portion 22 of each retainer plate 9 during engine operation, the support portion is not liable to become radially outwardly deformed because the support portion 22 is constantly supported by the cylindrical portion 30 of the piston 6.

As described above, according to the arrangement, the outer peripheral support portion 22 of each retainer plate 9 which supports the outer periphery of spring 8 can be supported by the outer peripheral cylindrical portion 30 of the piston 6 in close contact therewith. Therefore, any possible deformation of the retainer plate 9 due to centrifugal force of spring 8 can be effectively prevented and the possibility of cracking being caused to the retainer plate 9 can be eliminated.

Furthermore, the support portion 22 of each retainer plate 9 can be positioned as far radially outwardly as possible and accordingly the space for accommodating the spring at the inner side of the support portion 22 can be reasonably widened. Therefore, large diameter springs 8 may be used in order to provide increased vibration absorbing effect.

In addition, the retainer plates 9 are arcuate-configured and this permits good saving in material and material cost for retainer plate fabrication by stamping as compared with the case of fabricating the prior art annularly continued retainer plate.

Even if some gap is produced by reason of dimensional errors or otherwise between the outer peripheral support portion 22 of retainer plate 9 and the outer peripheral cylindrical portion 30 of the piston 6 as they are assembled together, with the result that the outer peripheral support portion 22 is radially deformed under centrifugal force, the occurrence of possible cracking due to such deformation can be effectively prevented, because the retainer plate assembly 9 is split in units, which naturally provides greater deformation allowance for the outer peripheral support portion 22. If any cracking should occur at all, further cracking can be effectively prevented by virtue of breaks (at ends 35).

Nextly, another embodiment will be described. The retainer plate 9 shown in FIG. 4 is not completely split in parts, its entirety being annularly continued. In this retainer plate 9, connector portions 21 and support portions 22 are alternately disposed on the outer periphery of the retainer plate 9, and for the entire retainer plate 9 there are eight each of connector portions 21 and support portions 22. Each support portion 22 has a length enough to cover a spring 8 (FIG. 2) and is therefore longer than the circumferential length of each connector portion 21. There are provided eight each of connector portions 23 and support portions 24. The connector portions 23 are radially inwardly arrayed relative to the connector portions 21 and are substantially same in circumferential length as the connector portions 2. Each support portion 24 is shorter in circumferential length than each support portion 22, for example, about one third of the latter, and is located radially inward of a circumferential median portion of each support portion 22.

Each support portion 24 is formed by cut-raising and an opening 40 produced by the cut-raising which extends circumferentially along and at outer side of the support portion 24. In the construction shown, there is provided a slit 41 extending from the radially outer edge of the opening 40 to the top edge of the support portion 22. Such slit 41 runs through a circumferentially central portion of each support portion 22, so that the retainer plate 9 is split into a plurality of arcuate portions by such slit 41 with respect to its portion located out side of openings 40. In other words, the openings 40 and slits 41 define a series of notches by which the retainer plate 9 is split into the plurality of generally arcuate portions at sites radially outward of the support portions 24.

According to the above described arrangement, for the purpose of setting the retainer plate 9 into the interior of the outer peripheral cylindrical portion 30 of the piston 6 as in FIG. 2 during the stage of assembly work, each support portion 22 can be resiliently deformed radially inwardly, since support portions 22 and adjacent retainer plate portions are split into parts by notches 40, 41. By setting the outer diameter of the support portion 22 prior to assembly at a value equal to or greater than the inner diameter of the cylindrical portion 30 of the piston 6, therefore, the retainer plate 9 can be resiliently deformed in order to fit the support portion 22 into the interior of the cylindrical portion 30 in close contact relation therewith.

Therefore, according to the above described arrangement, even if centrifugal force from springs 8 is applied to the support portion 22 of the retainer plate 9 during engine operation, the support portion is not liable to be radially outwardly deformed, because the support portion 22 is constantly supported by the cylindrical portion 30 of the piston, and thus the possibility of cracking being caused to the retainer plate 9 can be eliminated.

Furthermore, since the support portion 22 of the retainer plate 9 can be positioned as far radially outwardly as possible (until it goes into close contact with the cylindrical portion 30), the space in the interior of the support portion 2 for housing the springs can be extended. Therefore, a larger diameter spring 8 can be used to provide increased vibration absorbing effect.

In the construction shown in FIG. 5, there is provided no such slit 41 as shown in FIG. 4 and instead slits 45 are provided. The slits 45 individually extend generally radially outwardly from opposite ends of individual inner connector portions 23 over adjacent retainer plate portions 20 at outer side thereof to ends of outer connector portions 21. The retainer plate 9 has areas defining connector portions 21, 23 and areas defining support portions 22, 24 formed therein in alternate relation and, at radially outer sides of individual inner connector portions 23, a border portion between adjacent ones of those area is split into halves by a slit 45.

In the embodiment shown in FIG. 5, the support portion 22 can be resiliently deformed considerably by the action of the slit 45 and thus same functional effect as above mentioned can be obtained.

In the FIG. 4 embodiment, each inner connector portion 23 is formed by cut-raising a radially outer portion and therefore an opening formed as a result of the cut-raising is present radially at a site radially inward of the connector portion 23. In the embodiment shown in FIG. 5, slits 45 are formed as above stated, and therefore such cut-raised construction as in FIG. 4 cannot be used; instead of such construction, therefore, connector portion 23 is formed by an inner peripheral retainer plate portion and a bent portion continued to an outer peripheral connector portion 21.

In this way, the invention can be applied to damper discs for use in lock-up clutches for automotive torque converters or the like in order to provide effectively enhanced retaining function of a retainer plate relative to damper springs.

What is claimed is:

1. A damper disc for a lock-up clutch of a torque converter comprising an annular input plate selectively engageable with a housing of said torque converter, an output plate, damper springs extending circumferentially of the input plate and circumferentially connecting the input and output plates, and an annular retainer plate for holding said springs, said retainer plate having a base portion fixed to the input plate, connector portions circumferentially connected to ends of each of said springs, and circumferentially extending radially inner and radially outer support portions for supporting the outer periphery of each spring, said input plate being connected to said spring through said retainer plate, said input plate being formed on its outer periphery with a cylindrical portion fitted on the outer periphery of said radially outer support portion, said retainer plate being formed on its inner peripheral portion with said base portion, said connector portions and said support portions being arranged radially outward of said base portion and in circumferentially alternating relation, said retainer plate being formed with circumferentially spaced notches, each of said notches comprising an opening circumferentially aligned with and radially outward of a respective one of said radially inner support portions and a slit extending from a radially outer edge of said opening to the outer periphery of said radially outer support portions.

* * * * *